INVENTOR:
Smil Ruhman,
BY Bair, Freeman & Molinare
ATTORNEYS.

United States Patent Office 2,905,932
Patented Sept. 22, 1959

2,905,932

MAGNETIC CONTROL SYSTEMS

Smil Ruhman, Waltham, Mass., assignor, by mesne assignments, to Minneapolis-Honeywell Regulator Company, a corporation of Delaware

Application June 24, 1957, Serial No. 667,568

14 Claims. (Cl. 340—174)

This invention relates in general to electrical digital data handling apparatus and more particularly to new and improved timing and control circuitry of the type utilizing bi-statble magnetic cores as the active elements.

In many applications of digital data handling apparatus, it frequently is necessary to provide timing or control signals to various components of the apparatus at repetitive intervals with predetermined time spacings between the signals. Thus, for example, in electronic computers and control systems, it has been a common practice in the prior art to utilize single or cascaded rings, binary counters and feedback pattern generators as sources of electrical pulses for timing and control functions.

Advantageously, timing and control systems of the type described above utilize as one of their primary components, magnetic cores which preferably are formed of core material having a rectangular hysteresis loop with a large residual flux characteristic. As such magnetic cores have two stable states of magnetization, they have found great utility in digital data handling systems, and particularly in those systems employing the binary numbering system wherein the presence or absence of a pulse serves to indicate a binary "one" or "zero."

In the description that follows, a complete timing cycle will be discussed in terms of the pulse periods of the cycle or the number of discrete timing signals present when the circuit passes through a complete cycle. In a single core per bit shift register which is connected in a closed loop or ring, the number of pulse periods for the shifting of a signal completely around the loop defines the length of the timing cycle. The number of pulse periods in such a ring will be determined by the number of cores therein.

Many prior art magnetic core timing and control circuits have the disadvantage of requiring relatively large numbers of magnetic cores to effect their required functions.

This is particularly true when a number of separate and distinct timing pulses are required in any one timing cycle. Thus, in a timing or sequencing circuit wherein two separate timing signals are required when the circuit has, for example, a 35 pulse period timing cycle, a typical prior art ring would require 35 magnetic cores, and a typical prior art binary counter having delay stages would require 26 to 30 magnetic cores. A typical prior art pattern generator would require at least 21 magnetic cores. In sharp contrast to these prior art constructions, a 35 pulse period matrix constructed in accordance with my invention would require only 14 magnetic cores.

Accordingly, it is a general object of this invention to provide improved magnetic core timing and control circuitry for use in digital data handling systems.

It is another object of this invention to provide such magnetic core timing and control circuitry in which the number of magnetic cores required to carry out cyclic timing and sequencing functions is materially reduced.

It is a still further object of this invention to provide improved magnetic core timing and control circuitry in which desired discrete cyclic timing patterns may be achieved with a minimal number of active elements.

It is a further object of this invention to provide improved magnetic core timing and control circuitry, as described above, in which the economies realized over prior art constructions generally increase with the increase in timing cycle.

It is a still further object of this invention to provide new and improved magnetic core timing and control circuitry which is characterized by its relative simplicity, its flexibility, and its relative economy of construction and operation.

The above and other objects are realized in accordance with a specific illustrative embodiment of the invention wherein the timing and control circuitry comprises a matrix formed of a plurality of interrelated magnetic cores of the type having two stable states of magnetization which, for convenience, is sometimes hereinafter referred to as the "one" state and the "zero" state.

In one preferred embodiment, the matrix comprises a first closed ring of magnetic cores in which a selected core in the ring is set in the "one" state of magnetization and the remaining cores are in the "zero" state of magnetization. A second closed ring of magnetic cores is provided in which all of the magnetic cores except one are set in the "one" state.

In accordance with the invention, the two magnetic core rings define a pair of shift registers which are adapted to be pulsed from a common source or synchronized sources to the end that the predetermined pattern of "ones" and "zeros" in each ring is shifted or stepped around its ring by the applied shift pulses.

An output core, which may be increased to two or more depending upon the number of pulse timings required by the system, is connected to a selected point in each closed ring magnetic core circuit so as to be set in the one state of magnetization only once in each timing cycle. Due to the predetermined pattern of "ones" and "zeros" set in the two magnetic core rings, the output core is inhibited during all pulse periods with the exception of the one pulse period corresponding to the desired timing output.

It is a feature of this invention that the cycle of the magnetic core matrix is equal to the least common multiple of its dimensions, i.e., the least common multiple of the total number of magnetic cores in each closed ring. This arrangement makes it possible to reduce the number of cores required for any given timing cycle, and it is a further feature of this invention, that a minimum number of cores is realized when the two dimensions are prime with respect to each other and are close to each other in value. It is a further aspect of this invention that a larger matrix than that described above may advantageously be used with suitable feedback circuits to reduce its cycle to the desired length.

Further, as will be better understood from the detailed description given below, the larger the cycle of the matrix, the greater is the economy that may be achieved where multiple timing pulses are required. This desirable result is attained through the use of matrices having dimensions or closed rings greater than two, as the invention advantageously may be extended to an $n$-dimensional or $n$-ring system wherein the number of dimensions of rings is limited only by the physical characteristics of the logical elements used and the number and distribution in timing outputs required.

The above and other features of novelty which characterize the invention are pointed out with particularity in the claims annexed to and forming a part of this specification. For a better understanding of this invention, however, its advantages and specific objects attained with its use, reference is had to the accompanying drawing and descriptive matter in which is shown and described several illustrative embodiments of the invention.

Figures 1, 2, 3:
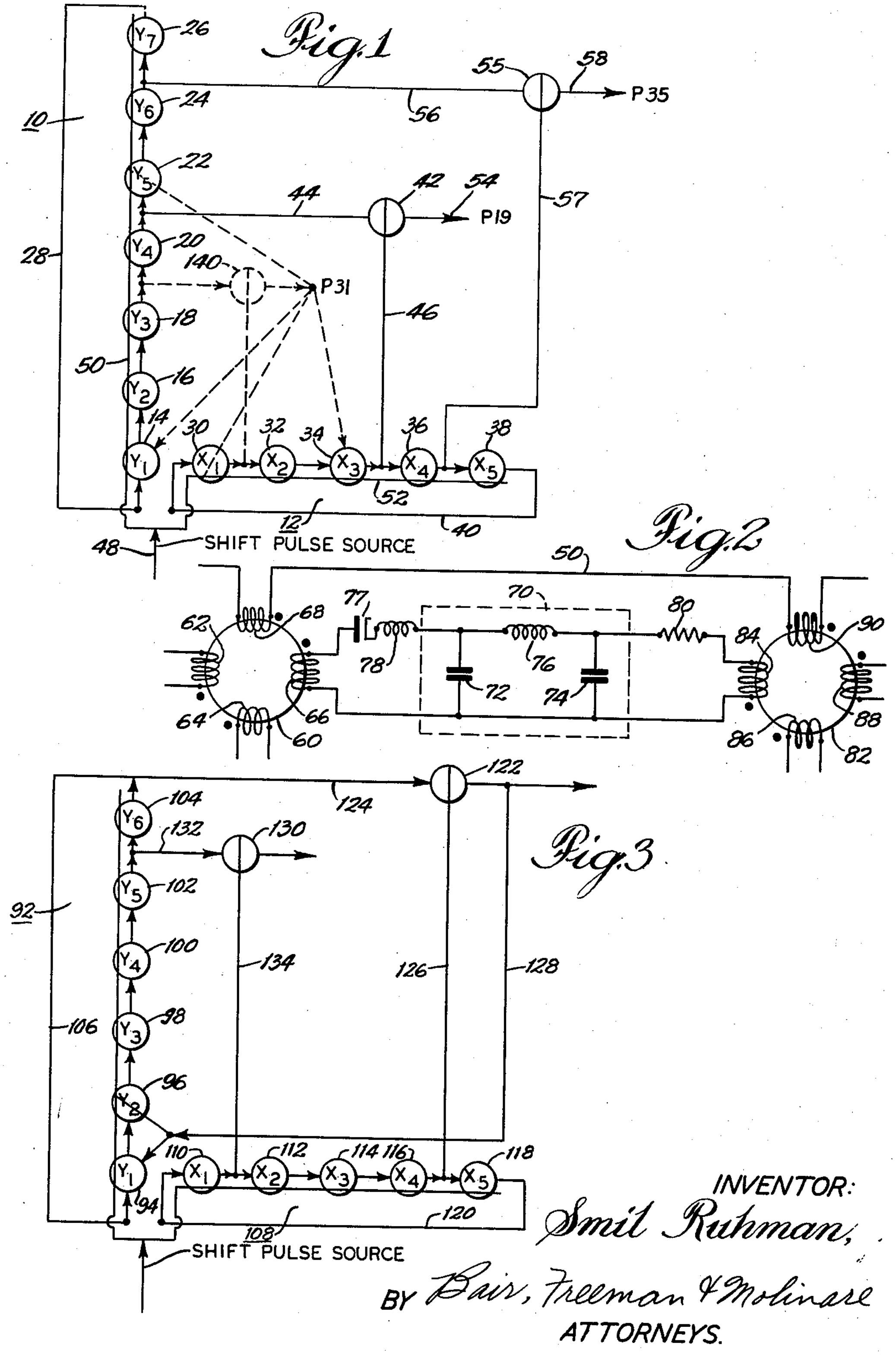
Figure 1 is a schematic diagram of an illustrative timing and control matrix embodying the invention.
Figure 2 is a diagrammatic showing of an illustrative magnetic core circuit suitable for use in the present invention.
Figure 3 is a schematic diagram of a further illustrative timing and control matrix embodying the invention.

Referring now to the drawing, and more particularly to Figure 1, there is shown a magnetic core timing matrix embodying principles of the invention which comprises a first closed ring 10 of magnetic cores and a second closed ring of magnetic cores 12 operatively associated with ring 10. Ring 10 comprises, in the illustrative embodiment of Figure 1, a magnetic core shift register in which a plurality of magnetic cores are arranged such that when shift pulses are applied to ring 10, the binary "ones" stored in the cores are shifted or stepped around the ring at a rate corresponding to the frequency of the shift pulses applied thereto.

The magnetic cores comprising the ring 10 include core 14, designated as $Y_1$, core 16 coupled to the output of core 14, and designated as $Y_2$, core 18 coupled to the output of core 16, and designated as $Y_3$, core 20 coupled to the output of core 18, and designated as $Y_4$, core 22 coupled to the output of core 20, and designated as $Y_5$, core 24 coupled to the output of core 22, and designated as $Y_6$, and core 26 coupled to the output of core 24, and designated as $Y_7$. Advantageously, the output of $Y_7$ core 26 is coupled by means of a feedback conductor 28 to the input of the $Y_1$ core 14, to the end that a closed ring is provided for enabling the binary "ones" stored therein to be shifted around the ring as many times as desired.

In a similar manner, the closed ring 12 is a magnetic core shift register which comprises a core 30 designated $X_1$, a core 32 connected to the output of core 30, and designated as $X_2$, a core 34 connected to the output of core 32, and designated as $X_3$, a core 36 connected to the output of core 34, and designated as $X_4$, and a core 38 connected to the output of core 36, and designated as $X_5$. The output of the $X_5$ core 38 is connected by means of the feedback conductor 40 to the input of the $X_1$ core 30 to the end that the binary "ones" stored in the ring 12 may be shifted around ring 12 as many times as desired in response to the shift pulses applied thereto.

Thus, it is seen that the magnetic core timing matrix shown in Figure 1 is a two-dimensional matrix comprised of a pair of closed ring magnetic core shift registers 10 and 12 which have seven magnetic cores and five magnetic cores, respectively. For the purposes of illustrating the invention, this two-dimentional magnetic core timing matrix will be described as providing output timing pulses having a cycle of 35 pulse periods. This may be realized by the provision of an output magnetic core 42 to which activating pulses are applied from ring 10 by means of a conductor 44 connected to the output of the $Y_4$ core 20 in ring 10, and to which inhibiting pulses are applied from ring 12 by means of conductor 46, connected to the output of $X_3$ core 34 in ring 12.

Initially, the $Y_1$ core 14 in ring 10 is set in the "one" state of magnetization, and the remaining cores $Y_2$ to $Y_7$ in ring 10 are in the "zero" state of magnetization. Also, the $X_2$ core 32, the $X_3$ core 34, $X_4$ core 36 and $X_5$ core 38 in ring 12 are set in the "one" state of magnetization; and the remaining core in ring 12, $X_1$ core 30 is in the "zero" state of magnetization.

It will be understood by those skilled in the art that the functional symbols shown in Figure 1 are those commonly used in the art to depict the connection of the magnetic cores.

Advantageously, shift pulses are applied to the closed ring shift registers from a suitable pulse source 48. Thus, shift pulses are applied to the shift windings of the magnetic cores in ring 10 over the line 50 and to the magnetic cores in ring 12 over the line 52. The application of shift pulses to the two closed ring shift registers from source 48 causes the pattern of "ones" and "zeros" initially set in each ring to be shifted or stepped around the rings in a cyclic fashion in a manner well understood in the art.

In the instant example, there will be no output pulse from the output core 42 whenever the $X_3$ core 34 in ring 12 has a binary "one" set therein since under these conditions output core 42 will be inhibited. However, when the $X_3$ core 34 in ring 12 is in the "zero" state of magnetization, and the $Y_4$ core 20 in ring 10 is in the "one" state of magnetization, output core 42 will be enabled to provide a timing output pulse at the output conductor 54.

With the particular core arrangement shown in Figure 1, and with the pattern of "ones" and "zeros" set therein as dsecribed above, it can be seen that the output core 42 will be activated initially after 18 shift pulses are applied, and thereafter only once for every 35 shift pulses. Since an additional shift is required to move the signal from core 42, the output timing pulse on conductor 54 may be designated at P–19. The timing of the output pulses may be varied at desired increments of one shift period by varying the point of feed and the point of inhibit for output core 42, that is, the particular cores in the shift registers to which the output core 42 is connected. Manifestly, additional output cores may be used to provide further timing outputs by the system. Thus, a core 55 is shown in Figure 1 with an assert line 56 coming from the output of the $Y_6$ core 24 and an inhibit line 57 coming from the output of the $X_4$ core 36. With the aforementioned initial setting of the X and Y cores, a signal will appear on the output line 58 at time P–35. This will be repeated again thirty-five pulse periods later.

It will also be apparent that the principles of the circuit of Figure 1 are applicable to a counter wherein the signals to be counted may be used as shift pulses to drive the signals preset in the matrix with a predetermined count being determined by the presence of an output signal at a selected point in the matrix. It will also be apparent that transistor-core devices of the type disclosed in the co-pending application of S. Guterman, entitled Magnetic Computer, Serial No. 471,319, filed November 26, 1954, may be used to advantage in a circuit of the type herein disclosed.

Although it will be fully understood by those skilled in the art that the elements making up the closed ring shift registers 10 and 12 of the matrix in Figure 1 may take the form of element having two stable states, advantageously, magnetic core stages may be used for this purpose. Figure 2 shows an illustrative magnetic core stage of the type disclosed in the co-pending application of Edward M. Ziolkowski, Serial No. 645,839, entitled Electrical Apparatus, filed March 13, 1957, which may be used in the present invention. This illustrative magnetic core stage comprises a magnetic core 60 upon which are wound a pair of input windings 62 and 64, an output winding 66, and a shift winding 68. In accordance with the invention, input winding 62 serves as the enabling winding and input winding 64 serves as the inhibit winding. As will be apparent, the need for an inhibit winding is not present on all of the cores.

A delay link 70 is coupled to the output winding 66 and comprises a pair of condensers 72 and 74 with a choke 76 connected therebetween. Connected to one input terminal of the delay link 70 is a diode 77 and a choke coil 78. Connected in series with the output of the delay link 70 is a resistor 80. The output of the delay link 70 feeds into a further magnetic core 82 having an enabling input winding 84, an inhibit input winding 86, an output winding 88, and a shift winding 90, the latter being driven together with shift winding 68 from the shift pulse source 48 over the shift line 50.

In order to illustrate the operation of Figure 2 it will be assumed that an input pulse is applied to the input winding 62 of core 60 and this input pulse is polarized to switch the residual flux of core 60 so that after the input pulse has been removed, the residual flux will be in the "one" state of magnetization. As soon as a shift pulse is applied to shift winding 68 from shift line 50, the shift pulse causes the flux in the core 60 to rapidly switch to the opposite or "zero" state of magnetization where it remains after the shift pulse is removed.

When the core 60 is switched from the "one" state of magnetization to the "zero" state, there is a large change of flux and, as a result, there is a relatively large output signal, proportional to this total flux change, produced in the output winding 66 if core 60.

This output signal from core 60 is fed through the delay link 70 to the succeeding core 82 where it has the effect of switching core 82 to its opposite state of magnetization. It will be understood that the incorporation in the delay link 70 of suitable frequency discriminating means serves to minimize unwanted signals, such as those resulting from shifting core 60 from the "zero" to the "one" state and signal reflections. It will further be apparent to those skilled in the art that other forms of magnetic core shift registers may satisfactorily be used in the matrix of Figure 1 in lieu of the illustrative circuit shown in Figure 2.

In the seven core by five core matrix shown in Figure 1, a normal cycle of 35 pulse periods was attained. It will be appreciated that the cyclic rate of this matrix is equal to the least common multiple of its dimensions. It is a feature of this invention that the number of core elements required to provide any desired timing cycle is determined by the least common multiple of the cores of the magnetic core rings forming the matrix. Further, a minimum number of such elements may be used when the two dimensions each contain a number of cores which numbers are prime with respect to each other and are close to each other in value.

It may be advantageous to provide a larger matrix having a greater cycle with suitable feed-back to limit the cycle to the desired length. For example, a cycle of 25 pulse periods may be attained from the six core by five core matrix shown in Figure 3 of the drawing. This matrix comprises a closed ring shift register 92 which includes a $Y_1$ core 94, a $Y_2$ core 96 connected to the output of the $Y_1$ core 94; a $Y_3$ core 98 connected to the output of $Y_2$ core 96; a $Y_4$ core 100 connected to the output of $Y_3$ core 98; a $Y_5$ core 102 connected to the output of the $Y_4$ core 100; and a $Y_6$ core 104 connected to the output of $Y_5$ core 102. The output of $Y_6$ core 104 is connected to the input of the $Y_1$ core 94 by means of conductor 106 to form a closed ring.

In a similar manner, the closed ring shift register 108 comprises an $X_1$ core 110; an $X_2$ core 112 connected to the output of $X_1$ core 110; an $X_3$ core 114 connected to the output of $X_2$ core 112; an $X_4$ core 116 connected to the output of $X_3$ core 114; and an $X_5$ core 118 connected to the output of the $X_4$ core 116. The output of $X_5$ core 118 is connected to the input of the $X_1$ core 110 by conductor 120 to form a closed ring.

A feed-back control core 122 which may also function as an output core has its input enabling winding connected by conductor 124 to the output of the $Y_6$ core 104 and its inhibit input winding connected by conductor 126 to the output of the $X_4$ core 116. Thus, it will be appreciated that an output pulse will be provided on conductor 128 from the control core 122 once every 25 pulse periods to reset the Y shift register ring 92. This operation may be illustrated by assuming, as in the case of the Figure 1 circuit, that initially the $Y_1$ core in ring 92 is set in the "one" state of magnetization and that the remaining cores in ring 92 are in the "zero" state of magnetization. Also, the $X_1$ core in ring 108 is in the "zero" state of magnetization initially, while the remaining cores in ring 108 are in the "one" state of magnetization. Under these conditions, pulsing of the two rings from the shift pulse source results in a "one" in the $Y_6$ core 104 and a "zero" in the $X_4$ core 116 after twenty-three shift pulses have been applied to the rings. On the twenty-fourth shift pulse, the feedback control core 122 will have a "one" shifted therein, and on the twenty-fifth pulse this "one" will be shifted to the conductor 128. In addition, this pulse will be fed back over conductor 128 to set the $Y_1$ core in the "one" state and will inhibit the $Y_2$ core to keep it in the "zero" state. Thus the circuit is reset to its initial condition in readiness for an additional twenty-five pulse period cycle of operation.

An output core 130 has its enabling input winding connected to the output of the $Y_5$ core 102 by conductor 132 and its inhibit input winding connected to the output of the $X_1$ core 110 by conductor 134.

It will be understood that the normal cycle of the matrix shown in Figure 3 is 30 pulse periods as the dimensions of the shift registers 92 and 108 in this matrix are six cores and five cores respectively. However, as the feed-back pulse from the control core 122 resets the Y shift register ring 92 at the end of every 25 pulse periods, the resultant cycle of the matrix will be a 25 pulse period cycle.

In a similar manner, a 32 pulse period cycle may be obtained from the seven core by five core matrix shown in Figure 1 by resetting both the Y ring 10 and the X ring 12 with a feed-back pulse that occurs every 32 pulse periods after the matrix has been in operation. This may be attained in accordance with an aspect of this invention by means of a control core 140, shown in dotted lines in Figure 1, which has its enabling input winding connected to the output of the $Y_3$ core 18 and its inhibit input winding connected to the output of the $X_1$ core 30. Thus, every 32 pulse periods a feed-back pulse is produced by control core 140 which serves to reset the X and Y rings as shown in dotted lines in Figure 1.

It is a feature of this invention that the principles described above with respect to the matrices shown in Figures 1 and 3 may be extended to three or more dimensions, the number of dimensions being limited only by the operating characteristics of the logical elements used, and by the number and distribution of the timing pulses required. In an *n*-dimensional system, for example, one closed ring shift register would circulate a single binary "one" while all of the other closed ring shift registers would circulate single binary "zeros." As with the circuits described above, the cycle of such a matrix is equal to the least common multiple of its dimensions and the minimum number of logical elements required is achieved when all of the dimensions are prime with respect to one another and when each dimension is close to the *n*th root of the desired cycle. Manifestly, feedback methods of the type described above would be applicable to such *n*-dimension matrices.

It will be appreciated that for matrices having a relatively large cycle, considerable savings can be effected by increasing the number of dimensions above two. Further, it will be appreciated that by the use of patterns other than a single binary "one" or "zero" in each ring, the matrix method of the invention may be extended to the generation of varied patterns of information available in any discrete timing. Further, as will be readily apparent, the apparatus may be used as a limit counter or as a sequencer.

While there has been shown and described several particular illustrative embodiments of the invention, it will be obvious to those skilled in the art that various changes and modifications may be made therein without departing from the invention and therefore, it is intended in the appended claims to cover all such changes and modifications as fully within the direct scope and spirit of the invention.

I claim as my invention:

1. In digital data handling apparatus, the improvement of a magnetic core timing and control circuit comprising a plurality of closed ring shift registers arranged to form a matrix, said shift registers comprising a plurality of magnetic cores each having two stable states of magnetization and input, output and shift windings, means for setting predetermined magnetic cores in each shift register in one of the two stable states of magnetization, the remaining cores being in the other stable state of magnetization, means for simultaneously applying shift pulses to each shift register to shift the pattern of set and unset cores therein around the closed ring in a continuous manner, output magnetic core means having two stable states of magnetization and enabling and inhibit windings, and means for connecting said enabling and inhibit windings to the outputs of selected magnetic cores in said closed ring shift registers whereby said output magnetic core means provides predetermined output timing pulses.

2. In digital data handling apparatus, the improvement of a timing and control circuit comprising a plurality of closed ring shift registers arranged to form a matrix, said shift registers comprising a plurality of bi-stable elements, means for setting predetermined bi-stable elements in each shift register in one of the two stable states, the remaining elements being in the other bi-stable state, means for simultaneously applying shift pulses to each shift register to shift the pattern of set and unset elements around the closed ring in a continuous manner, output bi-stable means having enabling and inhibit inputs, and means for connecting said enabling and inhibit inputs to the outputs of selected bi-stable elements in said closed ring shift registers whereby said output bi-stable means provides predetermined output timing pulses.

3. Digital data handling apparatus comprising a plurality of magnetic core shift registers arranged to form a matrix, means for setting predetermined magnetic cores in each shift register in a first stable state of magnetization, the remaining cores being in a second stable state of magnetization, means for simultaneously applying shift pulses to each shift register to shift the pattern of set and unset cores therein around the shift register in a continuous manner, output magnetic core means having two stable states of magnetization and enabling and inhibit windings, and means for connecting said enabling and inhibit windings to the outputs of selected magnetic cores in said shift registers whereby said output magnetic core means provides predetermined output timing pulses.

4. Digital data handling apparatus in accordance with claim 3 further comprising feedback control magnetic core means connected to the inputs of other selected magnetic cores in said shift registers for reducing the cycle of the matrix to a lesser value.

5. In digital data handling apparatus, the improvement comprising a plurality of multi-element shift registers arranged to form a matrix, means for setting a predetermined pattern of information data in each of said shift registers, means for simultaneously applying shift pulses to each shift register to shift the pattern of information data therein through the shift register, output means having enabling and inhibit inputs, and means for connecting said enabling and inhibit inputs to the outputs of selected elements in said shift registers whereby output timing pulses are provded from said output means only at predetermined intervals in the shift cycle of the matrix.

6. A magnetic core circuit comprising a plurality of shift registers arranged to form a matrix, said shift registers comprising a plurality of magnetic cores of the type having two stable states of magnetization and having input, output and shift winding associated therewith, means for setting the magnetic cores in each shift register in a predetermined pattern of magnetization, means for simultaneously shifting said pattern of magnetization in each shift register in a cyclic manner, output magnetic core means having enabling and inhibit windings, and means for connecting said enabling and inhibit windings to the outputs of selected magnetc cores in said shift registers whereby said output magnetic core means provides output timing pulses at cyclic intervals equal to the least common multiple of the magnetic cores in each shift register to the end that the number of magnetic cores required for timing functions desired is reduced to a minimal number.

7. A magnetic timing and control matrix comprising a first closed ring shift register and a second closed ring shift register defining a matrix, each shift register comprising a plurality of magnetic cores of the type having two stable states of magnetization and input, output and shift windings; means for placing said magnetic cores in predetermined patterns of set and unset cores, means for simultaneously applying shift pulses to the magnetic cores to shift the predetermined pattern around the closed ring shift registers in a continuous manner; output core means having enabling and inhibit windings, means connecting said enabling and inhibit windings to the outputs of selected magnetic cores in said first and second closed ring shift registers, whereby output timing pulses are provided from said output magnetic cores at a time dependent upon the number of cores in each closed ring shift register and the points in each shift register to which the enabling and inhibit windings of the output core means are connected.

8. A timing and control matrix comprising first and second closed ring shift registers, each having a plurality of elements of the type having two stable states, means for placing the elements in each shift register in a predetermined pattern of set and unset elements, means for simultaneously applying shift pulses to said elements to shift the predetermined patterns around the shift registers in a continuous manner, output means having enabling and inhibit inputs, means connecting said enabling and inhibit inputs to the outputs of selected elements in said first and second closed ring shift registers, whereby output timing pulses are provided from said output means at a time dependent upon the number of elements in each shift register and the points in each shift register to which the enabling and inhibit inputs of the output means are connected.

9. A timing and control circuit comprising a pair of shift registers arranged to define a matrix, each shift register comprising a plurality of bi-stable elements, means for placing the bi-stable elements in each shift register in a predetermined pattern of set and unset elements, means for simultaneously shifting said predetermined patterns around the shift registers in a cyclic manner, and output means connected to selected elements in said pair of shift registers whereby output timing pulses are provided from said output means at a desired rate.

10. A timing and control circuit in accordance with claim 9 further comprising second output means connected to different selected elements in said pair of shift registers for providing output timing pulses from said output means at a second desired time.

11. A timing and control circuit in accordance with claim 9 further comprising feedback control means connected to the outputs of chosen ones of said bi-stable elements in said pair of shift registers for resetting said shift registers at predetermined intervals to reduce the effective cycle of said matrix.

12. A magnetic timing and core matrix comprising a first shift register, a second shift register, said shift registers being operatively associated so as to define a matrix, each shift register comprising a closed ring of magnetic cores of the type having two stable states of magnetization, and having input, output, and shift windings provided therewith, means for placing the magnetic cores in the shift registers in predetermined patterns of set and unset cores, means for simultaneously applying shift pulses to the magnetic cores to shift said predetermined pattern around the shift registers, output magnetic core means having enabling, inhibit and output windings, means connecting said enabling winding to the output of one of the cores in said first shift register, means connecting said inhibit windings to the output of one of the cores in said second shift register, and output means connected to the output winding of said output magnetic core means whereby output timing pulses are present on said output means at a time determined by said predetermined pattern, the number of magnetic cores in said shift registers, and the connections from said output magnetic core means to said shift registers.

13. A magnetic timing and core matrix in accordance with claim 12 further comprising additional output magnetic core means having enabling and inhibit windings, and means connecting said enabling and inhibit windings to the outputs of different magnetic cores in said first and second shift registers, for providing output timing pulses at a different time.

14. A magnetic timing and core matrix in accordance with claim 12 further comprising feedback circuitry connected between the output windings of selected magnetic cores in said shift registers and the input windings of different magnetic cores in said shift registers for resetting the shift registers at desired points to reduce the maximum cyclic rate of the matrix to a lower value.

References Cited in the file of this patent

UNITED STATES PATENTS

| | | |
|---|---|---|
| 2,768,312 | Goodale et al. | Oct. 23, 1956 |
| 2,778,006 | Guterman | Jan. 15, 1957 |
| 2,794,130 | Newhouse et al. | May 28, 1957 |
| 2,812,450 | Barney | Nov. 5, 1957 |